United States Patent [19]

Reddy

[11] Patent Number: 5,762,827
[45] Date of Patent: Jun. 9, 1998

[54] YTTRIUM TANTALATE X-RAY PHOSPHORS WITH INCREASED LUMINANCE AND PARTICLE SIZE

[75] Inventor: Vaddi Butchi Reddy, Sayre, Pa.

[73] Assignee: Osram Sylvania Inc., Danvers, Mass.

[21] Appl. No.: 904,496

[22] Filed: Aug. 1, 1997

[51] Int. Cl.⁶ .................................................. C09K 11/78
[52] U.S. Cl. ........................... 252/301.4 F; 252/301.4 R
[58] Field of Search ....................... 252/301.4 F, 301.4 R

[56] References Cited

U.S. PATENT DOCUMENTS

| | | | |
|---|---|---|---|
| 4,225,653 | 9/1980 | Brixner | 428/539 |
| 4,925,702 | 5/1990 | Reddy | 252/301.4 R |
| 4,959,174 | 9/1990 | Nakajima et al. | 252/301.6 R |
| 5,009,807 | 4/1991 | Reddy | 252/301.4 H |
| 5,112,524 | 5/1992 | Reddy et al. | 252/301.4 R |
| 5,380,463 | 1/1995 | Reddy et al. | 252/301.4 R |

*Primary Examiner*—Melissa Bonner
*Attorney, Agent, or Firm*—Robert F. Clark

[57] ABSTRACT

A monoclinic M' yttrium tantalate x-ray phosphor containing a dopant selected from silicon or germanium to increase phosphor particle size and/or brightness. The phosphor is made by adding a silicon- or germanium-containing compound and a flux to the mixture of raw materials formulated to make the phosphor and then firing the doped mixture at a temperature and for a time sufficient to make the phosphor.

16 Claims, No Drawings

YTTRIUM TANTALATE X-RAY PHOSPHORS WITH INCREASED LUMINANCE AND PARTICLE SIZE

TECHNICAL FIELD

This invention relates to yttrium tantalate x-ray phosphors and their method of manufacture. More particularly, this invention relates to increasing the brightness and particle size of monoclinic M' yttrium tantalate x-ray phosphors.

BACKGROUND OF THE INVENTION

Monoclinic M' yttrium tantalate x-ray phosphors are predominately used in x-ray intensifying screens for medical and industrial x-ray imaging applications, e.g., $YNb_xTa_{1-x}O_4$ where x is 0 to about 0.1. The high density of $YTaO_4$ (7.56 g/cm$^3$) gives these phosphors a very good x-ray stopping capability and the emission of the Ta—O charge transfer band centered near 337 nm overlaps the sensitive region of x-ray films (for Nb-activated phosphors there is a Nb—O charge transfer band at 408 nm). These phosphors are incorporated into x-ray intensifying screens and used in combination with x-ray films to produce x-ray images. Other examples of these phosphors are given in U.S. Pat. Nos. 5,009,807, 5,112,524, 4,959,174 and 4,225,653 which are incorporated herein by reference.

Particle size and brightness are two of the most important criteria specified by manufacturers of x-ray intensifying screens. For example, larger particle size phosphors are used in certain industrial applications because of their ability to withstand higher x-ray dosages and high brightness phosphors are used in routine medical imaging and autochangers. Thus, it would be an advantage to have a method for increasing the particle size and/or brightness of yttrium tantalate x-ray phosphors.

SUMMARY OF THE INVENTION

It is an object of the invention to provide a monoclinic M' yttrium tantalate x-ray phosphor having increased particle size and/or brightness.

It is another object of the invention to provide a method for increasing the particle size and/or brightness of monoclinic M' yttrium tantalate x-ray phosphors.

In accordance with an object of the invention, there is provided a monoclinic M' yttrium tantalate x-ray phosphor containing a dopant selected from silicon or germanium to increase phosphor particle size.

In accordance with another object of the invention, there is provided a method for increasing the particle size of a monoclinic M' ytrrium tantalate x-ray phosphor comprising adding an amount of a compound containing silicon or germanium to a mixture of raw materials formulated to make the phosphor and firing the mixture at a temperature and for a time sufficient to form the phosphor.

In another aspect of the invention, the brightness of the phosphor under x-ray excitation is increased relative the same phosphor without the silicon or germanium dopant.

DESCRIPTION OF THE PREFERRED EMBODIMENTS

For a better understanding of the present invention, together with other and further objects, advantages and capabilities thereof, reference is made to the following disclosure and appended claims.

It has been discovered that by doping monoclinic M' yttrium tantalate x-ray phosphors with small molar amounts of silicon or germanium the particle size and/or brightness of the phosphor can be increased relative to the same phosphor without the dopant. In a general method, the Si- or Ge-containing compound and a flux is added to the mixture of raw materials formulated to make the desired phosphor and then fired at a temperature and for a time sufficient to make the phosphor. The preferred dopant compounds are $SiO_2$ and $GeO2$. A preferred concentration range is from about 0.01 to about 0.03 moles Si or Ge per mole $YTaO_4$ in the phosphor.

The following non-limiting examples are presented.

Germanium and silicon doped niobium-activated monoclinic M' yttrium tantalate x-ray phosphors having the general formula $YNb_xTa_{1-x}O_4$:M', where M' is either Si or Ge, were made by weighing 43.96 g tantalum oxide, $Ta_2O_5$, 22.58 g yttrium oxide, $Y_2O_3$, 0.1329 g (x=0.005) niobium oxide, $Nb_2O_5$, and 0.0 to 0.03 moles per mole $YTaO_4$ of germanium dioxide, $GeO_2$, or silicon dioxide, $SiO_2$, into 16 oz. plastic bottles. The mixtures were blended on a mechanical mixer for 15–30 minutes and a $LiCl-Li_2SO_4$ eutectic flux was added (13.32 g LiCl and 19.87 g $Li_2SO_4$, approximately 33 wt. % of the entire mixture). The mixture was then ball milled with high density alumina beads for 25–30 minutes. The beads were separated by sifting through a #6 stainless steel sieve and the mixtures were charged into 250 ml alumina crucibles and covered with alumina lids. The crucibles were fired in an electric furnace for about 12 hours at about 1290° C. using the following firing program: increasing from 200° C. to 800° C. over 7 hours, increasing from 800° C. to 1290° C. in 6 hours, holding at 1290° C. for 12 hours, and cooling from 1290° C. to 175° C. in 1 hour. The cooling period consisted essentially of shutting off the power to the furnace and allowing the furnace to cool at its own pace.

The fired crucibles were removed from the furnace and cooled to room temperature. After reaching room temperature, de-ionized (DI) water was added to each crucible and the samples were soaked for 2 to 4 hours to dissolve the flux. The soaked phosphors were transferred to 1.0 liter plastic beakers and washed 4 to 6 times with DI water to leach all the flux from the phosphor. The flux-free phosphors were filtered through #42 filter paper, dried at 110° C., and sifted to −325 mesh.

Each phosphor sample was analyzed for brightness by X-ray Optical Fluorescence (XOF) spectrometry using a tungsten x-ray anode at 80 kV as the excitation source. The integrated light emission from the samples was measured against a standard niobium-activated yttrium tantalate x-ray phosphor. The particle size distributions of the phosphor samples were measured by Coulter Counter using a 1% NaCl electrolyte solution. Each sample was ultrasonically dispersed for 5 minutes prior to the particle size measurement. Tables 1 and 2 give the measurement results for each sample.

TABLE 1

Germanium doped phosphors

| Sample No. | $GeO_2$ (moles per mole $YTaO_4$ in phosphor) | Relative XOF Brightness (%) | 50% Coulter Counter Size (μm) |
|---|---|---|---|
| Control | 0.00 | 107 | 6.95 |
| 1-1 | 0.01 | 105 | 8.37 |
| 1-2 | 0.02 | 113 | 8.15 |
| 1-3 | 0.03 | 102 | 10.1 |

TABLE 2

Silicon doped phosphors

| Sample No. | SiO$_2$ (moles per mole YTaO$_4$ in phosphor) | Relative XOF Brightness (%) | 50% Coulter Counter Size (μm) |
|---|---|---|---|
| Control | 0.00 | 107 | 6.95 |
| 2-1 | 0.01 | 115 | 7.90 |
| 2-2 | 0.02 | 121 | 9.50 |
| 2-3 | 0.03 | 123 | 10.9 |

The results demonstrate that the silicon and germanium dopants act to increase both phosphor brightness and particle size. The XOF brightness of the germanium doped phosphor was increased by as much as 6% over the control. In the case of the silicon, phosphor brightness was increased by as much as 15%. Phosphors doped with either germanium or silicon exhibited fairly consistent increases in particles size with increased dopant amounts. Tables 1 and 2 show that particle size was increased by 45% for germanium doped phosphors and 56% for silicon doped phosphors.

While there has been shown and described what are at the present considered the preferred embodiments of the invention, it will be obvious to those skilled in the art that various changes and modifications may be made therein without departing from the scope of the invention as defined by the appended claims.

I claim:

1. A monoclinic M' yttrium tantalate x-ray phosphor containing a dopant selected from silicon or germanium to increase phosphor particle size.

2. The phosphor of claim 1 wherein the amount of the dopant is from about 0.01 to about 0.03 moles per mole YTaO$_4$ in the phosphor.

3. The phosphor of claim 1 wherein phosphor brightness under x-ray excitation is increased relative the same phosphor without the dopant.

4. The phosphor of claim 2 wherein the dopant is germanium.

5. The phosphor of claim 2 wherein the dopant is silicon.

6. The phosphor of claim 3 wherein the dopant is germanium and the amount of germanium is 0.02 moles per mole YTaO$_4$ in the phosphor.

7. The phosphor of claim 3 wherein the dopant is silicon and the amount of silicon is 0.03 moles per mole YTaO$_4$ in the phosphor.

8. The phosphor of claim 1 wherein the phosphor has a general formula, YNb$_x$Ta$_{1-x}$O$_4$ where x is 0 to about 0.1.

9. The phosphor of claim 8 wherein the amount of the dopant is from about 0.01 to about 0.03 moles per mole YTaO$_4$ in the phosphor.

10. The phosphor of claim 9 wherein the dopant is germanium.

11. The phosphor of claim 9 wherein the dopant is silicon.

12. A method for increasing the particle size of a monoclinic M' yttrium tantalate x-ray phosphor comprising adding an amount of a compound containing silicon or germanium to a mixture of raw materials formulated to make the phosphor and firing the mixture at a temperature and for a time sufficient to form the phosphor.

13. The method of claim 12 wherein the compound is selected from silicon dioxide or germanium dioxide.

14. The method of claim 13 wherein the compound is added in an amount from about 0.01 to about 0.03 moles per mole YTaO$_4$ in the phosphor.

15. The method of claim 12 wherein the brightness under x-ray excitation is increased relative the same phosphor without the dopant.

16. The method of claim 12 wherein the phosphor is fired at about 1290° C. for about 12 hours.

* * * * *